(12) United States Patent
Peteri

(10) Patent No.: US 12,359,410 B2
(45) Date of Patent: Jul. 15, 2025

(54) WATER DISPENSING DEVICE

(71) Applicant: Quooker International B.V., Ridderkerk (NL)

(72) Inventor: Niels Theodoor Peteri, Rotterdam (NL)

(73) Assignee: Quooker International B.V., Ridderkerk (NL)

( * ) Notice: Subject to any disclaimer, the term of this patent is extended or adjusted under 35 U.S.C. 154(b) by 413 days.

(21) Appl. No.: 17/925,679

(22) PCT Filed: Jun. 3, 2021

(86) PCT No.: PCT/IB2021/054862
§ 371 (c)(1),
(2) Date: Nov. 16, 2022

(87) PCT Pub. No.: WO2021/245589
PCT Pub. Date: Dec. 9, 2021

(65) Prior Publication Data
US 2023/0193607 A1  Jun. 22, 2023

(30) Foreign Application Priority Data
Jun. 3, 2020  (NL) ..................................... 2025742

(51) Int. Cl.
*E03C 1/044* (2006.01)
*A23L 2/54* (2006.01)
(Continued)

(52) U.S. Cl.
CPC ................ *E03C 1/044* (2013.01); *A23L 2/54* (2013.01); *A23L 2/80* (2013.01); *C02F 1/283* (2013.01);
(Continued)

(58) Field of Classification Search
CPC .. E03C 1/044; E03C 2201/40; E03C 2201/45; A23L 2/54; A23L 2/80;
(Continued)

(56) References Cited

U.S. PATENT DOCUMENTS

| 4,601,263 A | * | 7/1986 | Shieh | ...................... F24D 17/00 |
| | | | | 122/18.2 |
| 2002/0050478 A1 | * | 5/2002 | Talbert | .................... F28D 7/106 |
| | | | | 210/931 |

(Continued)

FOREIGN PATENT DOCUMENTS

| DE | 195 35 265 C1 | 10/1996 |
| DE | 196 18 319 A1 | 11/1997 |

(Continued)

OTHER PUBLICATIONS

Japanese Patent Office, Japanese Patent Application No. 2022-574366, Office Action, dated Jan. 22, 2025, 6 pages.

*Primary Examiner* — Anthony J Weier
(74) *Attorney, Agent, or Firm* — Hoffmann & Baron, LLP

(57) ABSTRACT

A water dispensing device for at least dispensing cooled filtered drinking water, includes a hot water tank having a filter for filtering hot water, and a cold water tank. The water dispensing device includes a heat exchanger with a first heat exchange duct with a first inlet and a first outlet, and a second heat exchange duct with a second inlet and a second outlet, where the first inlet is connected to the hot water tank discharge and the first outlet is connected to the cold water tank feed, and where the second inlet is to be connected to a fresh water duct and the second outlet is connected to the hot water tank feed, so that the hot water can be fed from the hot water tank into the cold water tank via the first heat exchange duct in order to subsequently be dispensed as cooled filtered drinking water.

17 Claims, 3 Drawing Sheets

(51) Int. Cl.
*A23L 2/80* (2006.01)
*C02F 1/28* (2023.01)
*C02F 1/68* (2023.01)

(52) U.S. Cl.
CPC .......... *C02F 1/68* (2013.01); *C02F 2201/005* (2013.01); *C02F 2307/10* (2013.01); *E03C 2201/40* (2013.01); *E03C 2201/45* (2013.01)

(58) Field of Classification Search
CPC ...... C02F 1/68; C02F 1/283; C02F 2201/005; C02F 2307/10
See application file for complete search history.

(56) References Cited

U.S. PATENT DOCUMENTS

| | | | |
|---|---|---|---|
| 2016/0229715 A1* | 8/2016 | Kim | C02F 9/20 |
| 2018/0099854 A1* | 4/2018 | Jung | C02F 9/20 |
| 2020/0088483 A1 | 3/2020 | Chen | |
| 2025/0011150 A1* | 1/2025 | Peteri | E03C 1/0411 |

FOREIGN PATENT DOCUMENTS

| | | |
|---|---|---|
| EP | 3 366 850 A1 | 8/2018 |
| JP | H10-105826 A | 4/1988 |
| JP | 2002-107031 A | 4/2002 |
| JP | 2014-133578 A | 7/2014 |

\* cited by examiner

WATER DISPENSING DEVICE

CROSS-REFERENCE TO RELATED APPLICATIONS

This application is the National Stage of International Application No. PCT/IB2021/054862, filed Jun. 3, 2021, which claims the benefit of Netherlands Application No. 2025742, filed Jun. 3, 2020, the contents of which is incorporated by reference herein.

FIELD OF THE INVENTION

The invention relates to a water dispensing device for at least dispensing cooled filtered drinking water.

BACKGROUND OF THE INVENTION

Various water dispensing devices are known which are designed to dispense cooled water, which water is potentially carbonated. Cooled water has a temperature of, for example, 3° C. to 12° C., for example 10° C. This cooled water is generally used as drinking water. It is desirable to filter such water by means of a filter which is positioned in the water pipe between the connection to a fresh water supply, which delivers fresh water from a general water supply network, and a dispensing point for dispensing the filtered cooled water, for example a tap positioned in a kitchen.

The filter used for such a water dispensing device usually comprises an active carbon filter. The water is passed through this active carbon filter in order to filter the water. An active carbon filter additionally has a positive effect on the taste of the drinking water.

A disadvantage of such an active carbon filter is that it is susceptible to the growth of bacteria when used with cooled water. This is generally undesirable. Consequently, it is necessary to regularly replace the active carbon filter, or else the quality of the filtered cooled water will be significantly lower than desired. Such a disadvantage of relatively rapid fouling of a filter can also occur with other filters that are used in water dispensing devices for dispensing cooled filtered drinking water.

In addition to the use of an active carbon filter, an ultraviolet filter, also known as a UV filter or UV-C filter, is sometimes also used. This filter is used to kill bacteria. In some cases however, these filters can have additional disadvantages such as, for example, a relatively long warm initial flow which is not desirable in some cases, such as, for example, that of cooled drinking water.

SUMMARY OF THE INVENTION

An object of the invention is to provide a water dispensing device for at least dispensing cooled filtered water, in which the filter, for example an active carbon filter, is less susceptible to the growth of bacteria and other fouling of the filter.

The invention provides a water dispensing device for at least dispensing cooled filtered drinking water, comprising
 a hot water tank designed to keep hot water at a temperature of at least 65° C., for example at least 95° C., comprising:
  a filter for filtering the hot water,
  a hot water tank feed for feeding fresh water into the hot water tank,
  a hot water tank discharge for discharging hot water from the hot water tank, wherein the filter is arranged in the hot water tank, in the hot water tank discharge or in the hot water tank feed, such that the hot water discharged by the hot water tank discharge is filtered by the filter,
 a cold water tank designed to keep cooled water at a temperature of at most 20° C., comprising:
  a cold water tank feed for feeding water into the cold water tank,
  a cold water tank discharge for delivering cooled water from the cold water tank, characterized in that the device comprises
 a heat exchanger comprising:
  a first heat exchange duct with a first inlet and a first outlet, and
  a second heat exchange duct with a second inlet and a second outlet, wherein the first heat exchange duct and the second heat exchange duct are designed to exchange heat with one another,
 wherein the first inlet is connected to the hot water tank discharge and the first outlet is connected to the cold water tank feed, and wherein the second inlet is to be connected to a fresh water duct and the second outlet is connected to the hot water tank feed,
 so that the hot filtered water can be fed from the hot water tank into the cold water tank feed via the first heat exchange duct in order subsequently to be dispensed as cooled filtered drinking water.

In the water dispensing device according to the invention, the filter for filtering the water used for drinking is arranged in or close to the hot water tank which is designed to keep hot water at a temperature of at least 65° C., for example at least 95° C. In an embodiment, the hot water tank is kept at a temperature of at least 100° C. By virtue of this high temperature of the water of at least 65° C., for example at least 95° C., no or virtually no growth of bacteria will occur in the filter.

Consequently, the cold water tank will be fed only with sterilized filtered water. It is therefore no longer necessary to provide a filter in the cold water tank in order to deliver cooled filtered drinking water.

In order to use the filtered hot water as cooled filtered drinking water, the hot water has to be cooled to a temperature that is suitable for cooled water. In order to limit energy loss during this cooling, the water dispensing device according to the invention comprises a heat exchanger that transfers heat from the hot filtered water to fresh water that is drawn from the fresh water supply and that is used to fill the hot water tank. In this way, the amount of heat that is required to heat the fresh water up to the desired temperature of the hot water tank of, for example, at least 100° C. is also substantially decreased.

In an embodiment, the filter is an active carbon filter. An active carbon filter can be used to filter water that is used as drinking water. However, an active carbon filter is susceptible to bacterial growth. It is therefore advantageous to install such an active carbon filter in the hot water tank where the active carbon filter will experience no or very little bacterial growth by virtue of the higher temperature of at least 65° C.

In an embodiment, the water dispensing device has a hot water bypass duct that is connected to the hot water tank discharge and the cold water tank feed parallel to the first heat exchange duct, and at least one hot water bypass valve that can, selectively, allow hot water to flow through the first heat exchange duct or through the hot water bypass duct.

The hot water bypass duct is provided to route hot water to the cold water tank outside the heat exchanger, if desired.

The hot water bypass valve can be placed at least in a normal position and a bypass position. In the normal position, the hot water coming from the hot water tank discharge is routed to the cold water tank feed through the first heat exchange duct. In the bypass position, the hot water coming from the hot water tank discharge is routed to the cold water tank feed through the hot water bypass duct. The hot water bypass valve can also comprise two separate shut-off valves, wherein one shut-off valve can shut off the hot water bypass duct and the other shut-off valve can shut off access to the first inlet of the heat exchanger.

During normal use of the water dispensing device, the hot water bypass valve is in the closed position. The hot water that flows from the hot water tank to the cold water tank will then flow through the first heat exchange duct. By placing the hot water bypass valve in the bypass position, the hot water will flow directly from the hot water tank to the cold water tank, i.e. not through the first heat exchange duct of the heat exchanger. This hot water can then be used to neutralize any bacteria that might have developed over time in the cold water tank. For example, it may be desired to flush the cold water tank with hot water once per predetermined period, for example once every three or six months, in order to kill any bacteria in this cold water tank.

In an embodiment, the water dispensing device has a fresh water bypass duct that is to be connected to the fresh water duct and is connected to the hot water tank feed parallel to the second heat exchange duct, and at least one fresh water bypass valve that can, selectively, allow fresh water to flow through the second heat exchange duct or through the fresh water bypass duct. As an alternative or in addition to the hot water bypass duct, a fresh water bypass duct can be provided which connects the fresh water duct to the hot water tank feed. Using the fresh water bypass duct, fresh cold water can be delivered to the hot water tank feed outside the second heat exchange duct. In that case, no fresh cold water will flow through the heat exchanger. In this way, the hot water will not cool down in the first heat exchange duct and can be used as hot water in order to flush the cold water tank with hot water so that any bacteria that might have developed over time in the cold water tank are neutralized. The first heat exchange duct can also be flushed with the hot water.

The fresh water bypass valve can be placed at least in a normal position and a bypass position. In the normal position, the fresh cold water coming from the water supply network is routed to the hot water tank feed through the second heat exchange duct. In the bypass position, the fresh cold water coming from the water supply network is routed to the hot water tank feed through the fresh water bypass duct. The fresh water bypass valve can also comprise two separate shut-off valves, wherein one shut-off valve can shut off the fresh water bypass duct and the other shut-off valve can shut off access to the second inlet of the heat exchanger.

In an embodiment, the heat exchanger is a plate heat exchanger. A plate heat exchanger is a heat exchanger that exchanges heat by means of a number of plates stacked one above the other with passages arranged therein so as to form the first and second heat exchange ducts. Such a plate heat exchanger can effectively be used to exchange heat. Using such a heat exchanger, it is possible to transfer a large portion of the heat from the hot water to the fresh water.

In an embodiment, the water dispensing device comprises a $CO_2$ canister for supplying $CO_2$, wherein the cold water tank is designed to dissolve $CO_2$ in the cooled water in order to dispense carbonated cooled filtered water. In some embodiments, it is desirable to deliver carbonated cooled water from the cold water tank. For this, the water dispensing device can comprise a $CO_2$ canister that is designed to supply $CO_2$ that can be dissolved in the cooled water in the cold water tank.

In an embodiment, the cold water tank discharge is designed to deliver cooled water from the cold water tank and wherein the cold water tank comprises a second cold water tank discharge for delivering carbonated cooled water. With this embodiment, it is possible to use the cold water tank to deliver both cooled water and carbonated cooled water. For this, the cold water tank can have a first container for holding cooled water in which no carbonic acid is dissolved and a second container for holding carbonated cooled water, wherein the $CO_2$ canister is connected to the second container in order to dissolve $CO_2$ in the cooled water.

In an embodiment, the hot water tank is designed to keep hot water at a temperature of at least 100° C.

In an embodiment, the hot water tank comprises a second hot water tank discharge for delivering hot or boiling water. The hot water tank can be used to deliver hot or boiling water.

In an embodiment, the filter is arranged in or close to the hot water tank discharge in order to filter hot water that is delivered by the hot water tank discharge. By providing the filter in or close to the hot water tank discharge, the hot water is just filtered on leaving the hot water tank. As a result, the hot water in the hot water tank will have the desired temperature of, for example, at least 95° C. the longest and will not or hardly foul the filter with bacteria.

In an embodiment, the filter is arranged in or close to the hot water tank feed. The warmed fresh water, which flows through the filter, will thereby be heated by the heat exchanger to, for example, 80° C. to 95° C. This also ensures that a large portion, if not all, of the bacteria present in the fresh water are killed.

In an embodiment, the cold water tank comprises a cooling device in order to keep the cooled filtered water at a desired temperature. The cooling device can be any suitable device for keeping the cooled water at the desired temperature.

The invention also relates to a method for dispensing cooled filtered drinking water using a water dispensing device, comprising:
  feeding hot water from the hot water tank into the cold water tank via the first heat exchange duct, and feeding fresh water into the hot water tank via the second heat exchange duct,
  wherein heat is exchanged in the heat exchanger between the fresh water and the hot water in order to cool the hot water and warm the fresh water,
  further cooling the fed-in hot water in the cold water tank to obtain cooled filtered water at a desired temperature, and
  delivering the cooled filtered water from the cold water tank.

In an embodiment of the method, the water dispensing device has a hot water bypass duct that is connected to the hot water tank discharge and the cold water tank feed parallel to the first heat exchange duct, wherein the method comprises flushing the cold water tank with hot water from the hot water tank which is fed into the cold water tank via the hot water bypass duct.

In an embodiment of the method, the water dispensing device comprises a $CO_2$ canister for supplying $CO_2$, and wherein the method comprises dissolving $CO_2$ in the cooled water in the cold water tank in order to dispense carbonated cooled water.

The device according to the invention offers the possibility of a method for disinfecting a cold water tank of a water dispensing device, comprising:

keeping the hot water in the hot water tank at a temperature of at least 100° C., shutting off the water feed to the hot water tank, and delivering cooled water from the cold water tank, such that hot water from the hot water tank flushes the cold water tank and thereby disinfects the cold water tank.

In an embodiment, the hot water in the hot water tank is kept at a temperature of at least 100° C. When water is then discharged from the hot water tank while the hot water tank is shut off from the fresh water supply, the overpressure in the water dispensing device will drop, as a result of which the superheated water in the hot water tank will instantaneously boil and the steam formed thereby will therefore drive the cooled water out of the cold water tank, whereupon the cold water tank will be disinfected by the steam. This provides an effective method for disinfecting the water dispensing device. To disinfect a cold water tank with, for example, a capacity of 3 litres, less than 1 litre of superheated water is needed.

It is noted that various types of water are mentioned in this patent application. These are:

hot water, water with a temperature of at least 65° C., for example at least 95° C., also called boiling water when at a temperature of at least 100° C.;

warm water, water with a temperature in the range of 25° C. to 65° C.;

fresh water, water that is delivered by a water duct from the central water supply network or another source of fresh water;

cooled water, water that is cooled to a temperature of at most 20° C., for example at most 12° C., by the cool water tank;

carbonated cooled water, cooled water in which pressurized carbon dioxide gas is dissolved; and filtered water, water that is filtered by a filter, for example (carbonated) cooled filtered water.

BRIEF DESCRIPTION OF THE DRAWINGS

An embodiment of a water dispensing device according to the invention will be described in more detail below, with reference to the figures, in which.

DETAILED DESCRIPTION OF THE INVENTION

Figure 1:
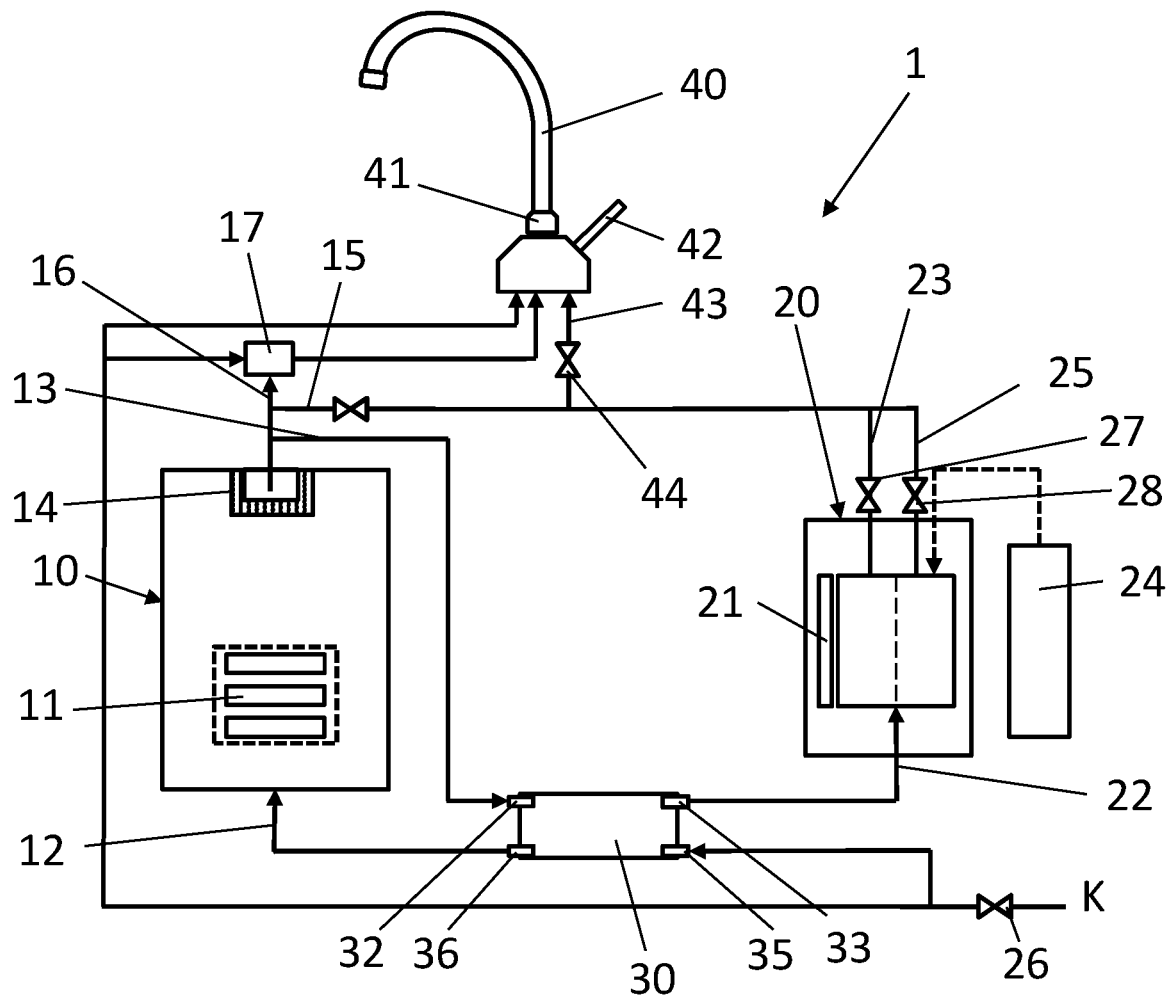
FIG. 1 schematically shows a first embodiment of a water dispensing device according to the invention.

FIG. 1 shows an embodiment of a water dispensing device for at least dispensing cooled filter water for drinking. The water dispensing device is denoted in general by the reference numeral 1. The water dispensing device 1 comprises a hot water tank 10, a cold water tank 20, a heat exchanger 30 and a tap 40.

The hot water tank 10 is designed to keep hot water at a temperature of, for example, 108° C. A heating device 11 with temperature control is arranged in the hot water tank 10 in order to heat the water in the hot water tank 10 to the desired temperature and to keep it at this temperature. The hot water tank 10 comprises a hot water tank feed 12 for feeding fresh water into the hot water tank 10 and a hot water tank discharge 13 for discharging hot water from the hot water tank 10. A filter 14 is arranged in the hot water tank 10 close to the start of the hot water tank discharge 13, which filter is for filtering the hot water that is discharged by the hot water tank discharge 13. The filter 14 is an active carbon filter that is designed to adsorb certain substances from the water using active carbon. The filter 14 is arranged in the hot water tank 10 because the temperature of the hot water is relatively high. By virtue of this high temperature, the filter 14 will remain free of bacterial growth. In particular, it is desirable for drinking water not to contain any bacteria.

The hot water tank 10 comprises a second hot water tank discharge 15 and a third hot water tank discharge 16. The first hot water tank discharge 13, the second hot water tank discharge 15 and the third hot water tank discharge 16 can be provided as three separate ducts from the hot water tank 10 or as a combined duct from the hot water tank 10 which is divided into the separate discharges as shown in FIG. 1.

The second hot water tank discharge 15 is directly connected to the tap 40 in order to dispense hot water. An operating button 41 is provided for dispensing the hot water. Upon flowing out of the hot water tank 10, the hot water will pass through the filter 14 and thus be dispensed as filtered hot water that is suitable for drinking. The water pressure in the hot water tank 10 is a superatmospheric water pressure as a result of the pressure of the water from a water supply network K by way of which fresh water is supplied and also because the water expands on being heated by the heat given off by heating device 11. Because of the overpressure, the hot water of, for example, 108° C. in the hot water tank 10 will not boil. Upon leaving the tap 40, the pressure of the hot water will drop to atmospheric pressure. As a result, the hot water will boil upon leaving the tap. The hot water is thus dispensed as boiling water in this embodiment.

The operating button 41 is designed to deliver an electrical signal that can be used to control a valve. In an alternative embodiment, the operating button 41 can be designed to operate a mechanical valve.

The third hot water tank discharge 16 is connected to a mixing device 17 for mixing the hot water from the hot water tank 10 with fresh water from a water supply network K at a certain mixing ratio in order to produce warm water. This warm water is then delivered to the tap 40. A second mixing device (not shown) is provided in the tap 40 which can be operated by means of operating element 42. The second mixing device is designed to mix fresh water with the warm water by manually adjusting the operating element 42 to the desired mixing ratio in order to dispense mixed water from the tap 40 in the temperature range between the temperature of the fresh water and the temperature of the warm water.

The cold water tank 20 is designed to keep cooled water at a temperature of at most 20° C., for example at most 10° C. A cooling device 21 with temperature control is arranged in the cold water tank 20 in order to cool the water in the cold water tank 20 to the desired temperature and to keep it at this temperature. The cold water tank 20 comprises a cold water tank feed 22 for feeding water into the cold water tank 20 and a cold water tank discharge 23 for discharging cooled water from the cold water tank 20.

The water dispensing device 1 comprises a $CO_2$ canister 24 for supplying pressurized $CO_2$. The cold water tank 20 is designed for the dissolution of $CO_2$ in the cooled water that is held in the cold water tank 20. In order to dissolve $CO_2$ in the cooled water, a pressure is required which is usually higher than the water pressure delivered by the water supply network K. The cold water tank 20 can comprise a pump in order to allow the water to flow through the cold water tank feed 22 into the cold water tank 20 against the higher pressure of the $CO_2$ canister 24. This pump thus delivers a water pressure that is higher than the pressure that is applied in the cold water tank 20 by the $CO_2$ canister 24.

By dissolving $CO_2$ in the cooled water, the cooled water can be dispensed as carbonated cooled water for drinking. The cold water tank 20 comprises a second cold water tank discharge 25 for delivering carbonated cooled water. The cold water tank discharge 23 and the second cold water tank discharge 25 are connected to the tap 40 which has an operating button 41 by means of which the dispensing of cooled water can be activated. The cold water tank 20 can be designed to deliver carbonated cooled water or cooled water in which no $CO_2$ from the $CO_2$ canister 24 is dissolved as desired depending on the operation of the operating button 41.

Valves 27, 28 are provided in the cold water tank discharge 23 and/or the second cold water tank discharge 25 for dispensing cooled or carbonated cooled water, respectively. These valves 27, 28 can thus be controlled using the operating button 41.

One and the same dispensing duct 43 is used for dispensing the hot water and the cooled water. The same operating button 41 is also used to dispense either boiling water or cooled water depending on the operation of the operating button 41. In an embodiment, it may be chosen to have a separate operating button for boiling water and for cooled water.

A valve 44 is arranged in the dispensing duct 43 which can be placed in an open state when dispensing hot water from the hot water tank 10 or dispensing cooled water from the cold water tank discharge 23, and a closed state when no water is dispensed via the dispensing duct 43. This valve 44 can prevent bacteria from moving from the tap 40 to the cold water tank discharge 23. Placing the valve 44 in the shared dispensing duct 43 affords the additional advantage of this valve 44 and the downstream portion of the dispensing duct 43 with respect to the valve 44 being flushed with hot water when hot water is dispensed, thereby killing bacteria present in the dispensing duct 43.

The valve 44 may potentially also be arranged in an unshared portion of the dispensing duct of the cold water tank 20.

The valve 44 can be any suitable valve which can be placed in an open state and a closed state. The valve 44 can be an actively operated valve, for example a solenoid valve, a valve that is operated by the water pressure, for example a non-return valve, or a manually operated valve.

In alternative embodiments, various dispensing ducts and/or various operating buttons can be used to dispense hot water, cooled water and/or cooled carbonated water. It is also possible to provide separate taps, for example a separate tap for the mixed water, a separate tap for the hot water and a separate tap for the cooled water.

Figure 2:
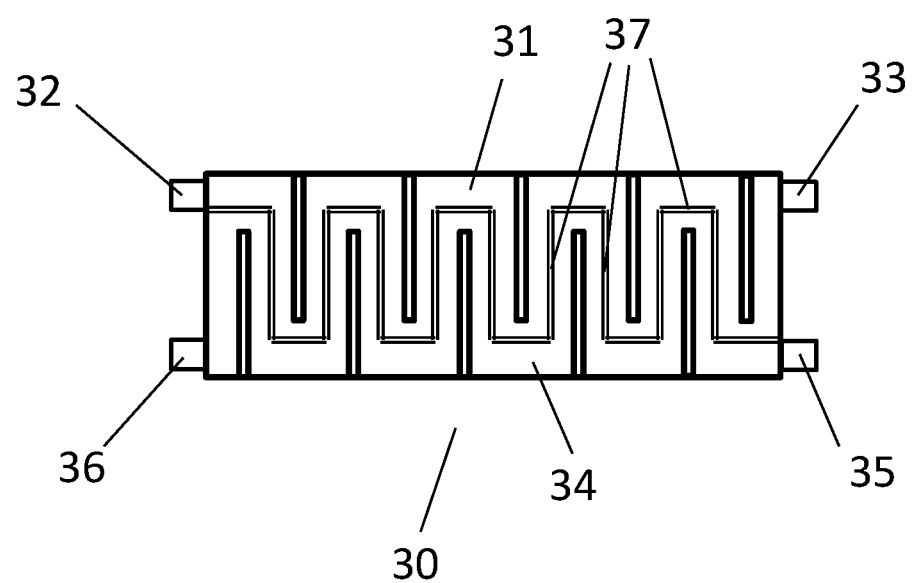
FIG. 2 schematically shows a cross section of a plate heat exchanger that can be used in the embodiment of FIG. 1.

The heat exchanger 30 is a plate heat exchanger. A cross section of this heat exchanger 30 is schematically shown in FIG. 2. The heat exchanger 30 comprises a first heat exchange duct 31 with a first inlet 32 and a first outlet 33 and a second heat exchange duct 34 with a second inlet 35 and a second outlet 36. The first heat exchange duct 31 and the second heat exchange duct 34 are designed to exchange heat with one another via plates 37 which are arranged between the first heat exchange duct 31 and the second heat exchange duct 34.

As shown in FIG. 1, the first inlet 32 of the heat exchanger 30 is connected to the hot water tank discharge 13 and the first outlet 33 is connected to the cold water tank feed 22, so that hot water from the hot water tank 10 can be fed into the cold water tank 20 via the heat exchanger 30.

The second inlet 35 of the heat exchanger 30 is connected to a fresh water supply network K by way of which fresh water can be supplied. The second inlet 35 can also be connected to any other suitable source for supplying fresh water, e.g. a fresh water storage tank. The second outlet 36 is connected to the hot water tank feed 12.

The internal volume of the heat exchanger 30 can be a small volume relative to the volume of the cold water tank 20. The internal volume of the heat exchanger 30 is, for example, at most 20% of the internal volume of the cold water tank 20, such as at most 10% of the internal volume of the cold water tank 20.

When the dispensing of cooled water is activated by operating the operating button 41 of the tap 40, cooled water will be dispensed from the cold water tank 20. Because of the cold water flowing out of the cold water tank 20, the water pressure in the cold water tank 20 will decrease. As a result, hot water will flow from the hot water tank 10 through the first hot water tank discharge 13 to the cold water tank 20 via the first heat exchange duct 31 of the heat exchanger 30 in order to replace the dispensed cooled water. At the same time, the hot water flowing out of the hot water tank 10 will be replaced with fresh water which will flow from the water supply network K to the hot water tank feed 12 of the hot water tank 10 via the second heat exchange duct 34.

The cooled water that is dispensed from the cold water tank 20 is thus from the hot water tank 10. As this water flows from the hot water tank 10 to the cold water tank 20, the water will pass through the filter 14 and is thus filtered. The cooled water dispensed from the tap 40 is therefore filtered water that is suitable for drinking. Additionally, it is advantageous that the filter 14 is placed in the hot water tank 10 so that the filter 14 does not or seldom experiences bacterial growth.

By virtue of the fresh water and the hot water flowing through the heat exchanger 30 in opposite directions, the heat from the hot water in the first heat exchange duct 31 will effectively be transferred to the fresh water in the second heat exchange duct 34. The temperature of the hot water will thus decrease in the heat exchanger 30 and the temperature of the fresh water will conversely increase. This means that less energy is required in the hot water tank 10 to heat the fresh water to the desired temperature of 108° C., while a limited amount of extra energy, in comparison with direct cooling of the supply water, is required in the cold water tank 20 to cool the cooled hot water to the desired temperature of the cold water, for example 10° C.

In a plate heat exchanger such as schematically shown in FIG. 2, it is, for example, possible to cool the hot water from approximately 108° C. to approximately 22° C. to 30° C., while the fresh water can be warmed from a temperature of, for example, 15° C. to, for example, 80° C. to 95° C.

In the embodiment of FIG. 1, a valve 26 is provided in the supply duct for the fresh water, i.e. between the fresh water supply network K and the hot water tank 10. In the embodiment shown, the valve 26 is placed in the duct from the water supply network K to the second inlet 35 of the heat exchanger 30. As an alternative, the valve 26 can also be provided between the second outlet 36 of the heat exchanger 30 and the hot water tank feed 12 of the hot water tank 10.

The valve 26 can be placed in an open state and a closed state. During normal use of the water dispensing device 1, the valve 26 will be placed in the open state, such that water that is dispensed via the tap 40 is supplemented by water from the fresh water supply network K. The water pressure of the fresh water supply network K is then also used to dispense water, unless the water is carbonated water delivered from the cold water tank 20. Specifically, when dispensing carbonated water, use is made of a pump which delivers a higher water pressure than the pressure that is applied by the $CO_2$ canister 24 in the second container of the cold water tank 20.

To effectively disinfect the water dispensing device 1, for example upon first use, the valve 26 can be placed in the closed state, where the temperature of the hot water in the hot water tank must also be at least 100° C. When, with the valve 26 in this closed state, cooled water is dispensed from the cold water tank 20, then by opening valve 27 and/or valve 28, the falling pressure in the hot water tank 10 will cause the superheated water to instantaneously boil and the steam formed thereby will force the cooled water out of the cold water tank 20 to the tap 40 via the associated ducts, such as the cold water tank discharge 23 and/or the second cold water tank discharge 25 and the dispensing duct. The overpressure of the water vapour formed in the hot water tank of, for example, 108° C. is 0.3 bar, which is more than sufficient to drive the cooled water out of the cold water tank. As the cooled water is driven out, steam will flow through the cold water tank 20 and associated ducts until the interior of the cold water tank 20 and the associated ducts are boiling hot. All bacteria are then killed. The inlet valve 26 should then be opened so that the emptied cold water tank 20 is again filled up with cooled water, after which the first valve 27 and/or the second valve 28 can again be closed. The amount of superheated water that is needed to disinfect the water dispensing device 1 in this way is relatively limited by virtue of the use of steam for disinfection. To disinfect a cold water tank with a capacity of 2 litres, less than 1 litre of superheated water is needed.

Once the water dispensing device 1 has been disinfected in this way, all of the water in the cold water tank 20 is from the hot water tank 10. As long as the temperature in the hot water tank 10 is above 100° C., this water is sterile and no new bacteria enter the cold water tank 20.

Additionally, it has been shown that contamination from the tap also does not or hardly occurs. As already described above, it is additionally also possible to arrange a valve 44 in the dispensing duct 43 in order to further limit the risk of contamination.

It has been shown that using this water dispensing device 1, sterile cooled and hot water can be dispensed for a longer time. If desired, the water dispensing device 1 can be disinfected periodically, for example once every three or six months, or after a certain period of the water dispensing device not being used.

Figure 3:
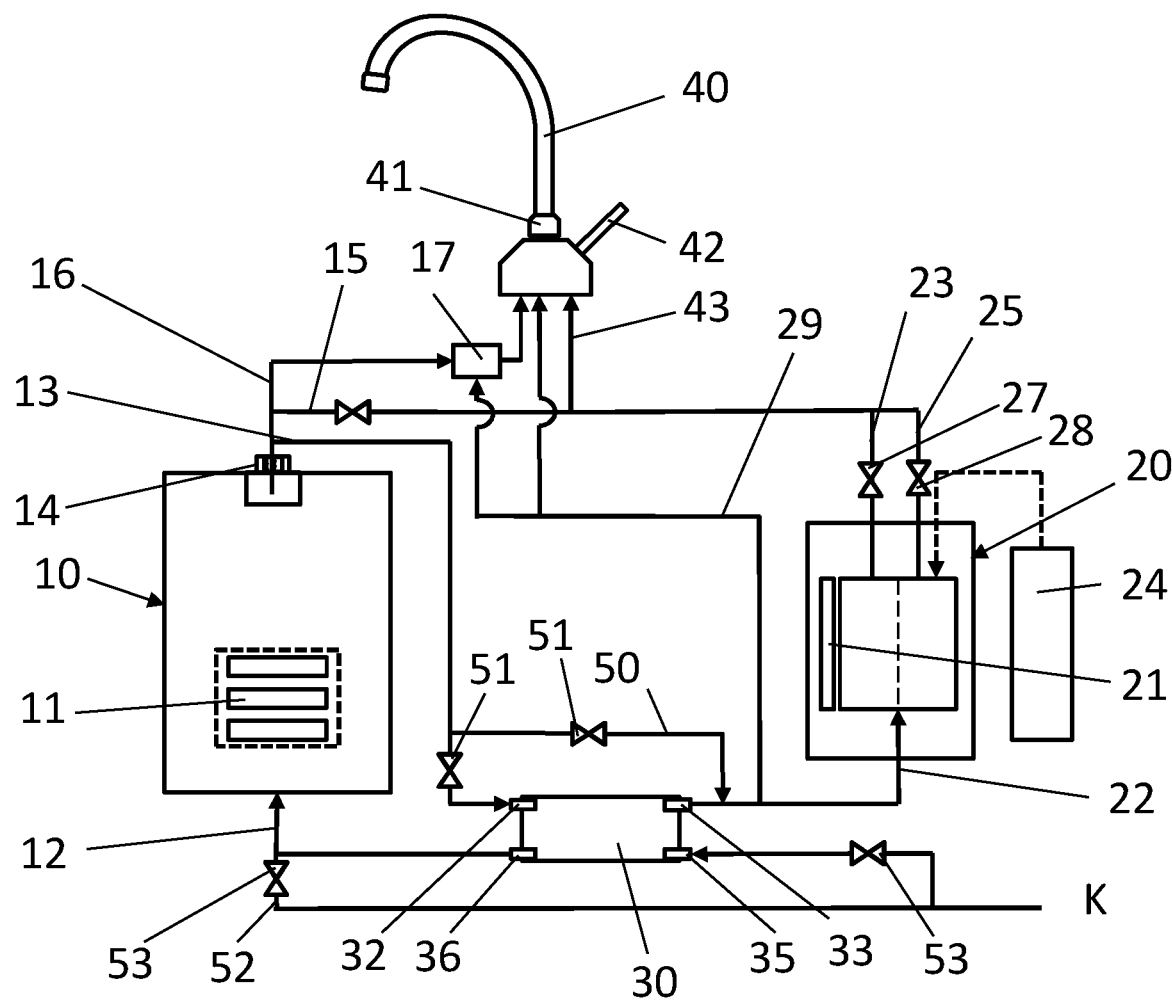
FIG. 3 schematically shows a second embodiment of a water dispensing device according to the invention.

FIG. 3 shows an alternative embodiment of a water dispensing device according to the invention. Components with the same reference numerals have the same function and will not be discussed separately here.

To dispense mixed water in this embodiment, water from the first heat exchanger discharge 33 is used, which is routed to the mixing device 17 and/or directly to the second mixing device in the tap 40 via a duct 29 that branches off from the cold water tank discharge 22. In this embodiment, all of the water that can be dispensed by the tap 40 is thus originally from the hot water tank 10 and therefore free of bacteria.

Additionally, the filter 14 is arranged in the hot water tank discharge 13 in this embodiment.

The water dispensing device 1 according to FIG. 3 comprises a hot water bypass duct 50 which is connected to the hot water tank discharge 13 and the cold water tank feed 22 parallel to the first heat exchange duct 31 and a fresh water bypass duct 52 which is connected at one end to the water supply network K and is connected at the other end to the hot water tank feed 12 parallel to the second heat exchange duct 32. By opening one or both of these bypass ducts, it is possible to disinfect the cold water tank and the feed and discharge ducts thereof with hot water from the hot water tank.

A combination of hot water bypass valves 51 is arranged in the hot water bypass duct 50 and the first heat exchange duct 31. The hot water bypass valves 51 can be placed at least in a normal position and a bypass position. In the normal position, the hot water coming from the hot water tank discharge 13 is routed to the cold water tank feed 22 through the first heat exchange duct 31, as discussed above. In the bypass position, the hot water coming from the hot water tank discharge 13 is routed to the cold water tank feed 22 through the hot water bypass duct 50. With the hot water bypass valves 51 in this position, the hot water will flow directly from the hot water tank 10 to the cold water tank 20, i.e. via the hot water bypass duct 50 instead of through the first heat exchange duct 31 of the heat exchanger 30. The hot water will then not be cooled down in the heat exchanger 30 and will flow into the cold water tank 20 with a high temperature of, for example, at least 95° C. In the cold water tank 20, this hot water can be used to neutralize any bacteria that might have developed over time in the cold water tank 20.

In addition, or as an alternative, the fresh water bypass duct 52 can be used to disinfect the cold water tank and the feed and discharge ducts thereof with hot water. A combination of fresh water bypass valves 53 is provided in the fresh water bypass duct 52 and the second heat exchange duct 32, which can, selectively, allow fresh water to flow through the second heat exchange duct 32 or through the fresh water bypass duct 52.

For this, the fresh water bypass valves 53 can be placed in a normal position and a bypass position. In the normal position, the fresh water coming from the water supply network K is routed to the hot water tank feed 12 through the second heat exchange duct 32, as described above. In the bypass position, the fresh water coming from the water supply network K is routed to the hot water tank feed 12 through the fresh water bypass duct 52.

Using the fresh water bypass duct 52, fresh cold water can be delivered to the hot water tank feed 12 outside the second heat exchange duct 32. In that case, no fresh cold water will flow through the heat exchanger 30. In this way, when the hot water bypass valve 51 is placed in the normal position, the hot water will not be actively cooled in the first heat exchange duct 31 and can be used as hot water in order to flush the cold water tank 20 with hot water so that any bacteria that might have developed over time in the cold water tank 20 or in the first heat exchange duct 31 are neutralized.

The hot water bypass duct 50 and the fresh water bypass duct 52 can be provided as alternatives or in combination.

The invention claimed is:
1. A water dispensing device for at least dispensing cooled filtered drinking water, comprising
    a hot water tank designed to keep hot water at a temperature of at least 65° C., comprising:
        a filter for filtering the hot water, a hot water tank feed for feeding fresh water into the hot water tank, a hot water tank discharge for discharging hot water from the hot water tank, wherein the filter is arranged in the hot water tank, in the hot water tank discharge or in the hot water tank feed, such that the hot water discharged by the hot water tank discharge is filtered by the filter, a cold water tank designed to keep cooled water at a temperature of at most 20° C., comprising:

a cold water tank feed for feeding water into the cold water tank, a cold water tank discharge for delivering cooled water from the cold water tank, wherein the water dispensing device comprises:

a heat exchanger comprising:

a first heat exchange duct with a first inlet and a first outlet, and a second heat exchange duct with a second inlet and a second outlet, wherein the first heat exchange duct and the second heat exchange duct are designed to exchange heat with one another, wherein the first inlet is connected to the hot water tank discharge and the first outlet is connected to the cold water tank feed, and wherein the second inlet is to be connected to a fresh water duct and the second outlet is connected to the hot water tank feed, so that the hot water can be fed from the hot water tank into the cold water tank via the first heat exchange duct in order subsequently to be dispensed as cooled filtered drinking water.

2. The water dispensing device according to claim 1, wherein the filter is an active carbon filter.

3. The water dispensing device according to claim 1, wherein the water dispensing device comprises a shut-off valve in order to shut off the water feed from the fresh water duct to the hot water tank.

4. The water dispensing device according to claim 1, wherein the water dispensing device has a hot water bypass duct that is connected to the hot water tank discharge and the cold water tank feed parallel to the first heat exchange duct, and at least one hot water bypass valve that can, selectively, allow hot water to flow through the first heat exchange duct or through the hot water bypass duct.

5. The water dispensing device according to claim 1, wherein the water dispensing device has a fresh water bypass duct that is to be connected to the fresh water duct and is connected to the hot water tank feed parallel to the second heat exchange duct, and at least one fresh water bypass valve that can, selectively, allow fresh water to flow through the second heat exchange duct or through the fresh water bypass duct.

6. The water dispensing device according to claim 1, wherein the heat exchanger is a plate heat exchanger.

7. The water dispensing device according to claim 1, wherein the device comprises a $CO_2$ canister for supplying $CO_2$, and wherein the cold water tank is designed to dissolve $CO_2$ in the cooled water in order to dispense carbonated cooled filtered water.

8. The water dispensing device according to claim 1, wherein the cold water tank discharge is designed to deliver cooled filtered water from the cold water tank and wherein the cold water tank comprises a second cold water tank discharge for delivering carbonated cooled filtered water.

9. The water dispensing device according to claim 1, wherein the hot water tank is designed to keep hot water at a temperature of at least 100° C.

10. The water dispensing device according to claim 1, wherein the hot water tank comprises a second hot water tank discharge for delivering hot or boiling water.

11. The water dispensing device according to claim 1, wherein the filter is arranged in or close to the hot water tank discharge or else in or close to the hot water tank feed in order to filter hot water that is delivered by the hot water tank discharge.

12. The water dispensing device according to claim 1, wherein the cold water tank comprises a cooling device in order to bring the cooled filtered water to a desired temperature and keep it at that temperature.

13. A method for dispensing cooled filtered drinking water using a water dispensing device claim 1, comprising:

feeding hot water from the hot water tank into the cold water tank via the first heat exchange duct, and feeding fresh water into the hot water tank via the second heat exchange duct, wherein heat is exchanged in the heat exchanger between the fresh water and the hot water in order to cool the hot water and warm the fresh water, further cooling the fed-in hot water in the cold water tank feed to obtain cooled filtered water at a desired temperature, and delivering the cooled filtered water from the cold water tank.

14. The method according to claim 13, wherein the water dispensing device has a fresh water bypass duct that is connected to the water supply network K and the hot water tank feed parallel to the second heat exchange duct, wherein the method comprises flushing the cold water tank with hot water from the hot water tank which is fed into the cold water tank via the cold water bypass duct, the hot water tank and the first heat exchange duct.

15. The method according to claim 13, wherein the water dispensing device has a hot water bypass duct that is connected to the hot water tank discharge and the cold water tank feed parallel to the first heat exchange duct, wherein the method comprises flushing the cold water tank feed with hot water from the hot water tank which is fed into the cold water tank via the hot water bypass duct.

16. The method according to claim 13, wherein the water dispensing device comprises a $CO_2$ canister for supplying $CO_2$, and wherein the method comprises dissolving $CO_2$ in the cooled water in a second container of the cold water tank in order to dispense carbonated cooled water.

17. The water dispensing device according to claim 1, wherein the hot water tank is designed to keep hot water at a temperature of at least 95° C.

* * * * *